United States Patent
Pogorelik et al.

(10) Patent No.: US 11,062,056 B2
(45) Date of Patent: *Jul. 13, 2021

(54) TRUSTED INDICATORS TO SECURE VISUAL OUTPUTS

(71) Applicant: McAfee, LLC, San Jose, CA (US)

(72) Inventors: Oleg Pogorelik, Lapid (IL); Ned Smith, Santa Clara, CA (US); Igor Muttik, Aylesbury (GB); Alex Nayshtut, Gan Yavne (IL)

(73) Assignee: McAfee, LLC, San Jose, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 16/222,528

(22) Filed: Dec. 17, 2018

(65) Prior Publication Data

US 2019/0138700 A1 May 9, 2019

Related U.S. Application Data

(63) Continuation of application No. 15/017,355, filed on Feb. 5, 2016, now Pat. No. 10,211,989.

(51) Int. Cl.
*G06F 21/64* (2013.01)
*G06T 1/00* (2006.01)
(Continued)

(52) U.S. Cl.
CPC .............. *G06F 21/64* (2013.01); *G06F 21/16* (2013.01); *G06T 1/0021* (2013.01); *G09C 5/00* (2013.01);
(Continued)

(58) Field of Classification Search
CPC .................. G06F 21/16; G06F 21/602; G06F 21/64–645; G06F 2221/0733;
(Continued)

(56) References Cited

U.S. PATENT DOCUMENTS 5,898,779 A * 4/1999 Squilla ............... H04N 1/32128
380/200
6,005,936 A * 12/1999 Shimizu ................ G06T 1/0028
713/176
(Continued)

FOREIGN PATENT DOCUMENTS

JP 2008176762 7/2008
KR 20130071674 7/2013

OTHER PUBLICATIONS

International Searching Authority, "International Search Report and Written Opinion," issued in connection with International Patent Application No. PCT/US2017/015839, dated May 12, 2017, 14 pages.
(Continued)

*Primary Examiner* — Kevin Bechtel
(74) *Attorney, Agent, or Firm* — Hanley, Flight & Zimmerman, LLC

(57) ABSTRACT

An example display device for securing graphics outputs includes: a checker to check whether a secure output marker is located in a pre-determined position in graphical information of a digital image; a verifier to verify whether first data in the secure output marker matches actual data in a trusted output area of the digital image; and autonomous indicator control logic to activate a hardware-based trusted output indicator when the first data matches the actual data, the autonomous indicator control logic not accessible by computing applications executing on a system in communication with the display device.

21 Claims, 8 Drawing Sheets

(51) Int. Cl.
*G09C 5/00* (2006.01)
*H04L 9/32* (2006.01)
*H04N 1/32* (2006.01)
*G06F 21/16* (2013.01)

(52) U.S. Cl.
CPC .......... *H04L 9/3239* (2013.01); *H04L 9/3242* (2013.01); *H04N 1/32229* (2013.01); *H04N 1/32272* (2013.01); *G06F 2221/0733* (2013.01); *G06F 2221/2151* (2013.01); *G06T 2201/0051* (2013.01); *G06T 2201/0065* (2013.01); *H04L 2209/34* (2013.01)

(58) Field of Classification Search
CPC ........... G06F 2221/2151; G06T 1/0021; G06T 1/0042; G06T 2201/0051; G06T 2201/0065; G09C 5/00; H04L 9/3236–3257; H04L 2209/606; H04L 2209/608; H04N 1/32101–32352; H04N 21/8352; H04N 21/8358; H04N 2201/3233–324; H04N 2201/3281
See application file for complete search history.

(56) References Cited

U.S. PATENT DOCUMENTS

| | | |
|---|---|---|
| 6,269,446 B1 | 7/2001 | Schumacher et al. |
| 2009/0022358 A1 | 1/2009 | Tian et al. |
| 2013/0263215 A1 | 10/2013 | Ekdahl |
| 2014/0101782 A1* | 4/2014 | Beaumont ............... G06F 21/85 726/30 |
| 2015/0082416 A1 | 3/2015 | Strassmann et al. |
| 2015/0348515 A1 | 12/2015 | Danisevkis |
| 2017/0230181 A1 | 8/2017 | Pogorelik et al. |

OTHER PUBLICATIONS

United States Patent and Trademark Office, "Notice of Allowance," issued in connection with U.S. Appl. No. 15/017,355, dated Nov. 2, 2018, 14 pages.

United States Patent and Trademark Office, "Final Office Action," issued in connection with U.S. Appl. No. 15/017,355, dated Dec. 28, 2017, 18 pages.

United States Patent and Trademark Office, "Non-final Office Action," issued in connection with U.S. Appl. No. 15/017,355, dated Aug. 29, 2017, 20 pages.

* cited by examiner

TRUSTED INDICATORS TO SECURE VISUAL OUTPUTS

TECHNICAL FIELD

Embodiments described herein generally relate to computing security and securing visual outputs, and in particular for determining whether a digital image outputted to a display device originates from an image rendering trusted source.

BACKGROUND ART

Computing security threats, such as computer viruses, worms, Trojans are a common and growing concern that plague today's computing systems. Computing security threats are typically designed to perform a variety of intrusive functions that include, but are not limited to disrupting computer operations, gathering personal and confidential information, and gaining access to private computing and network systems. To perform these intrusive functions, the computing security threats are generally encoded to exploit vulnerabilities and/or security lapses within the software (e.g., operating systems and web browsers) of a computing system. For example, malware based on return-oriented programming (ROP), may utilize a buffer overrun vulnerability to execute the malware instructions. Unfortunately, as today's industries and societies maintain their reliance on computing devices and network-based technologies (e.g., the Internet), the proliferation of computing security threats continue to flourish.

To protect today's information systems, computing systems are often equipped with a variety of security computing applications, such as anti-malware that attempt to provide countermeasures from computing security threats. For example, anti-malware applications are able to reduce vulnerability and harm from malware attacks by providing real-time preventive protection and/or removal of potential malware code. However, security computing applications typically fail to resolve security vulnerabilities relating to securing visual outputs. For instance, in phishing and/or masquerading trustworthy entity attacks, users of computing systems may be unaware that digital images exposed on a display screen are malicious and spoofed by a harmful application. Users may inadvertently enter sensitive and/or confidential information when viewing the illegitimate or unsecured digital images (e.g., a cloned website displayed in a web browser). As such, constantly improving the technology of detecting computing security threats and securing visual outputs remain valuable in protecting sensitive and confidential information within a computing environment.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
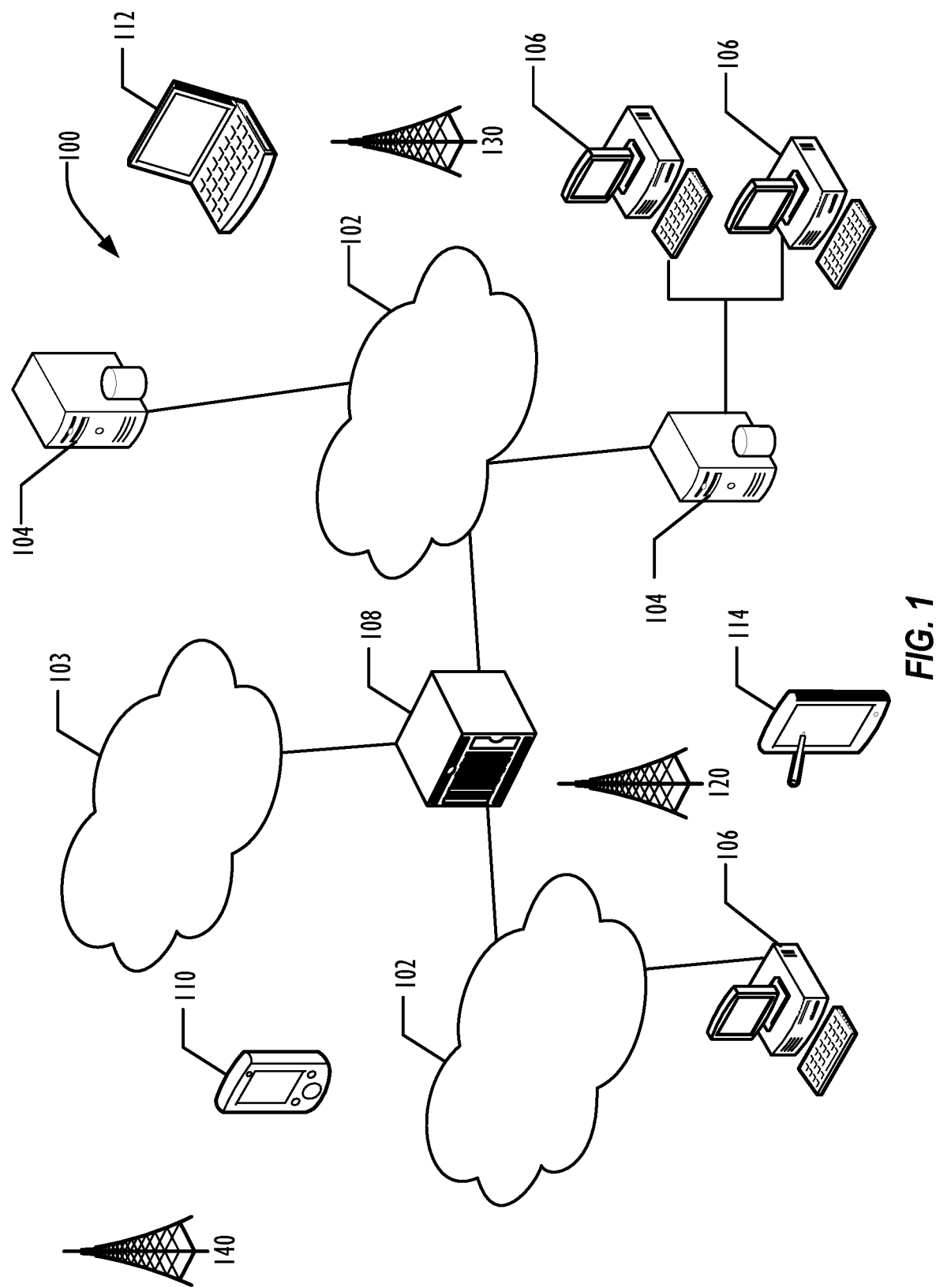
FIG. 1 is a schematic diagram of an embodiment of a network infrastructure where embodiments of the present disclosure may operate herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" refers to a single electronic computing device that includes, but is not limited to a single computer, laptop, host, virtual machine (VM), container, tenant, server, network device, wearable electronic device (e.g., smart glasses), and/or mobile device (e.g., smartphone, tablet, and/or other smart device) or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "computing application" refers to a computing module, program, process, workload, thread and/or a set of computing instructions executed by a computing system. Example embodiments of a computing application include software modules, software objects, firmware (e.g., Basic Input/Output System (BIOS)), and/or other types of executable code.

As used herein, the term "digital image" refers to computer graphics that are capable of being displayed onto a screen by an electronic computing device. In one embodiment, the digital image may be configured to allow a user to input data that implements one or more computing processes, such as computing windows within an operating system (OS). Non-limiting examples of digital images include digital pictures, computing windows, text only windows, visual areas associated with one or more graphical user interface (GUI), digital video, and/or other visual images viewed by a user of an electronic computing device.

Various example embodiments are disclosed herein that produce a spoof resistant and a secure visual output for digital images capable of being exposed by a display device. To provide secure visual outputs, a display device may enable a TOI when currently viewed digital images, such as web browser windows, originate from an image rendering trusted source, such as Protected Audio and Video Path (PAVP), high bandwidth digital content protection (HDCP), and/or sprite. The TOI may be controlled by an autonomous indicator control logic within the display device that cannot be accessed by computing applications running on the computing system. For example, using an autonomous indicator control logic may mitigate attacks or security threats that manipulate z-order graphical frames outputted to a display device. The display device may activate the TOT when the outputted digital image includes proof of trust information (POTI), such as secure output markers that provide location information and data content corresponding to trusted output areas of the outputted digital image. If a malicious computing application (e.g., malware) modifies and/or overlays the trusted output areas designated by the POTI, the POTI may become broken, disabling the TOI. In one embodiment, the POTI may be signed, encrypted, or both using keys managed and provisioned in a trusted execution environment (TEE). The POTI may also be forwarded and controlled over insecure channels by embedding the POTI within the outputted digital image using steganography.

FIG. 1 is a schematic diagram of an embodiment of a network infrastructure 100 where embodiments of the present disclosure may operate herein. Network infrastructure 100 comprises a plurality of computer networks 102. Each of the computer networks 102 may contain a number of other devices typically referred to as Internet of Things (microcontrollers, embedded systems, industrial control computing modules, etc.). Specifically, computer networks 102 comprise one or more different types of computer networks available today, such as the Internet, enterprise networks, data centers, a wide area networks (WAN), and/or a local area networks (LAN). Each of these networks within computer networks 102 may contain wired and/or wireless programmable devices that operate in the electrical and/or optical domain, and also employ any number of network communication protocols (e.g., TCP/IP). For example, one or more of the networks within computer networks 102 may be a wireless fidelity (Wi-Fi®) network, a Bluetooth® network, a Zigbee® network, and/or any other suitable radio based network as would be appreciated by one of ordinary skill in the art upon viewing this disclosure.

The networks within computer networks 102 may also comprise switches, routers, and/or other network hardware devices configured to transport data over computer networks 102. Moreover, one or more of the networks within computer networks 102 may be configured to implement computer virtualization, such as virtual private network (VPN) and/or cloud based networking. FIG. 1 illustrates that computer networks 102 may be connected to computers 106, computer servers 104, and one or more network nodes 108, which include, but are not limited to gateways, routers, and/or wireless access points. In one embodiment, one or more of the computers 106 and/or computer servers 104 may each comprise a plurality of VMs, containers, and/or other types of virtualized computing systems for processing computing instructions and transmitting and/or receiving data over computer networks 102. Although not illustrated in FIG. 1, the network infrastructure 100 may connect computer networks 102 to a variety of other types of computing device, such as VMs, containers, hosts, storage devices, electronic user devices (e.g., wearable electronic devices), and/or any other electronic device capable of transmitting and/or receiving data over computer networks 102. The functionality of the network node 108 may be implemented in any device or combination of devices illustrated in FIG. 1; however, most commonly is implemented in a firewall or intrusion protection system in a gateway or router.

As shown in FIG. 1, network infrastructure 100 may also comprise a cellular network 103 for use with mobile communication devices. The cellular network 103 may be capable of supporting of a variety of electronic devices that include, but are not limited to computers, laptops, mobile devices (e.g., mobile phones) and/or other electronic user devices. Using FIG. 1 as an example, electronic devices in the network infrastructure 100 may communicate via the cellular network 103 are illustrated as mobile phones 110, laptops 112, and tablets 114. A mobile device, such as mobile phone 110, may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node 108. In addition, the mobile devices 110, 112, and 114 may interact with non-mobile devices such as computers 104 and computer servers 106 for desired services.

In one or more embodiments, one or more mobile devices 110, 112, and 114, computer servers 104, computers 106, and/or other computing systems (e.g., wearable devices) may support trusted operations through the employment of a TEE. For example, a TEE may be implemented using a manageability engine, computing chipset, and/or other separate computing logic unit. Additionally or alternatively, a TEE may be implemented using secure enclaves, such as Intel's Software Guard Extensions (SGX) technology. Other examples of TEE technology implemented by the computing systems may include, but are not limited to Advanced RISC Machines (ARM) TrustZone®, Advanced Micro Devices® (AMD) Platform Security Processor, Trustonic's Kinibi®, securiTEE, OP-TEE, TLK, T6, Open TEE, and SierraTEE, CSE, VT-x, MemCore, Canary Island, Docker®, and Smack. The computing system, such as mobile devices 110, 112, and 114, computer servers 104, and computers 106, in network infrastructure 100 that support trusted operations may be referred to as trusted network devices throughout this disclosure. Trusted networks may be formed dynamically using trusted discovery which allows trusted network devices to discover other trusted network devices, or trusted network nodes, that include a trusted entity. Trusted discovery may be necessary to reveal additional trusted capabilities and services among trusted devices. Some examples of protocols that may be revealed only by trusted discovery include attestation, key agreement, group formation, trusted proxy, and provisioning.

In one embodiment, one or more mobile devices 110, 112, and 114, computer servers 104, computers 106, and/or other computing systems are configured with a trusted output engine that operates in a TEE and may be part of an image rendering trusted source. When a computing application within a computing system attempts to render a digital image, the computing application may call the trusted output engine. The trusted output engine is configured to generate POTI, which refers to information that indicates corresponding data content originates from one or more trusted sources. POTI may utilize encryption, cryptography, and/or authentication technologies that use one or more secrets or hidden data to create and determine that data content originates from a trusted source. POTI may also be embedded within the data content using data embedding technologies, such as steganography. Example embodiments of POTI include, but are not limited to, encrypted and embedded secure output markers and digital watermarks embedded within media content.

In one embodiment, the trusted output engine creates secure output markers that include location display coordinates corresponding to a trusted output area of a digital image, the area size of the trusted output area, and data content (e.g., a hash value) that represents the actual data content located within the trusted output area. The trusted output engine may obtain one or more stored security keys within a key manager to encrypt and sign the secure output markers. In one embodiment, the data content within the POTI is a hash value constructed from the stored security keys and/or actual data content located within the trusted output area using a hashing algorithm known by persons of ordinary skill in the art, such as Secure Hash Algorithm 2 (SHA-2), message-digest 5 (MD5), and Secure Hash Algorithm 3 (SHA-3). The actual data content located within the trusted output area of the digital image is encoded using data structures known by persons of ordinary skill in the art to encode a digital image, such as a bit array, bitmap, vectors, tuples, and/or lists.

The secure output markers may subsequently be embedded within a rendered digital image using steganography to form a trusted digital image. Steganography may be used to modify a portion of the digital image's data content by embedding the secure output markers within the trusted digital image. Steganography may embed hidden or invisible information that may not affect the quality of the original digital image. For example, the trusted output engine may perform steganography by using one bit from every pixel of the rendered digital image to embed the secure output markers. Embedding POTI using steganography may be beneficial by providing backward compatibility and minimize development and adoption issues for existing display device. Specifically, embedding secure output markers within a digital image allows for outputted digital images to be forwarded and controlled over insecure channels and are not limited to TEE and/or secured channels. Other well-known methods besides steganography may be used to embed hidden or invisible information within a digital image.

The trusted digital image is outputted to and exposed on a display device. The display device may be coupled to and/or part of the one or more mobile devices 110, 112, and 114, computer servers 104, computers 106, and/or other computing systems (e.g., wearable devices). Examples of display devices include monitors, televisions, projectors, built-in display screens, wearable screens, and/or other types of electronic visual displays. At the display device side, a display control logic may be configured to check for secure output markers at pre-determined positions within the trusted digital image based on the steganography encoding. In checking for valid secure output markers, the display control logic may also decrypt the secure output markers and validate the signature using the same stored security keys obtained by the trusted output engine. After verifying the signature of the secure output markers, the decrypted information within the POTI, such as the secure output markers, are checked with the data content in the corresponding trusted output areas of the exposed digital image. If the decrypted information within the POTI match the data content in the corresponding trusted output areas, the display control logic may enable the TOI.

Malicious computing application may be unable to access the TOI by encrypting and embedding the POTI within the outputted digital image. Malicious computing applications often spoof digital images and window outputs, such as cloned website in a web browser window, without invoking the image rendering trusted source and/or trusted output engine. In this instance, when the spoofed digital image is received by the display control logic, the display control logic may be unable to locate the POTI at the pre-determined positions within the spoofed digital image. Malicious computing applications can also spoof images by modifying and/or overlaying a rendered digital image generated from the image rendering trusted source and/or trusted output engine. For example, some malicious computing applications may manipulate z-order graphical frames outputted to a display device. However, when the designated trusted output areas of the rendered digital image are modified and/or overlaid, the POTI becomes broken such that the information provided by the POTI no longer matches the modified data content within the trusted output areas. In both examples, the display control logic enables and/or disables the TOI to alert the user that the exposed digital image is not from a trusted source.

Additionally, a malicious computing application may attempt to replay a digital image previously rendered by the image rendering trusted source and/or trusted output engine. However, the display control logic may be adapted to detect replay attempts by having the image rendering trusted source and/or trusted output engine generate POTI that includes information used to verify whether each rendered image is distinct. For example, to detect replay attempts, POTI may include a timestamp value synchronized to the clocks of the computing system and the display device, a random value verified by the display control logic that the value was not used previously, and/or a value supplied over a backchannel that is verified by the display control logic when it receives the POTI value. Other embodiments may use well-known methods to generate information within a POTI to verify whether an image is a replay image or a distinct secured image.

Figure 2:
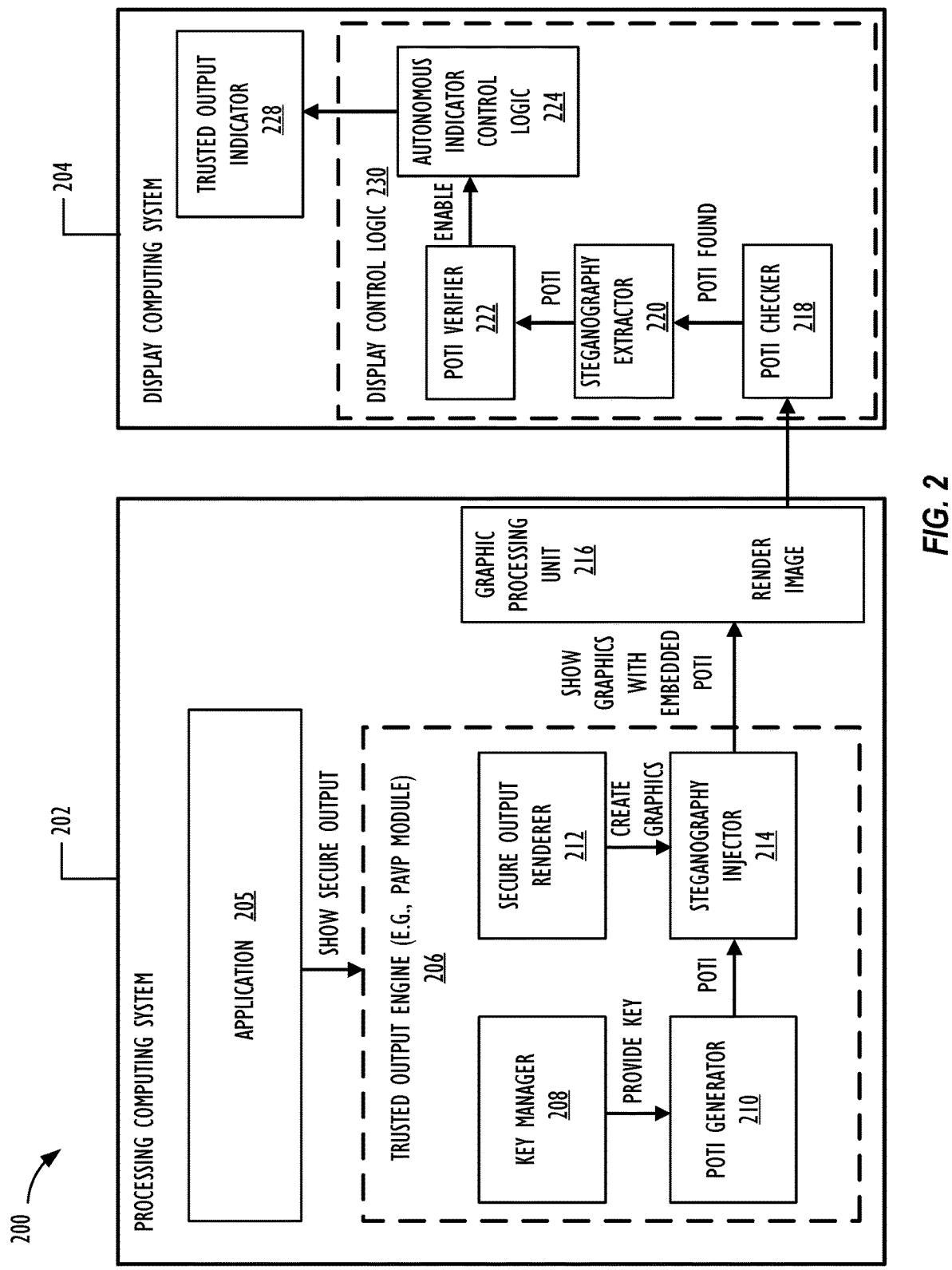
FIG. 2 is a schematic diagram of an embodiment of a computing system architecture configured to secure graphics outputs.

FIG. 2 is a schematic diagram of an embodiment of a computing system architecture 200 configured to secure graphics outputs. FIG. 2 illustrates that the computing system architecture 200 comprises a processing computing system 202 and a display computing system 204. Using FIG. 1 as an example, computing system architecture 200 may be implemented in a TEE with trusted network devices. In particular, the application computing system 202 and display computing system 204 may be implemented using one or more of the mobile devices 110, 112, and 114, computer servers 104, computers 106, and/or electronic devices capable of connecting to computer network 102 and/or cellular network 103 that are shown in FIG. 1. As shown in FIG. 2, the processing computing system 202 and the display computing system 204 are implemented as separate devices that connected together using an externally wired and/or wireless video connections that include, but are not limited to, a video graphics array (VGA) connection, a digital visual interface (DVI) connection, and/or a high-definition multimedia interface (HDMI) connection. In another embodiment, the display computing system 204 may be embedded and internally connected to the application computing system 202, for example, displays screens installed for mobile devices, laptops, and smart devices. In other embodiments, the computing system architecture 200 may comprise a plurality of display computing systems 204 that are externally connected, internally connected, or both to the processing computing system 202.

The processing computing system 202 is configured to render and output digital images using image rendering trusted sources that include, but are not limited to Intel's PAVP technology, HDCP, and sprite. FIG. 2 illustrates that the processing computing system 202 comprises a trusted output engine 206 that is implemented as part of and/or as a module of the image rendering trusted source. The trusted output engine 206 is configured to secure graphics outputs, such as digital pictures, computing windows, visual areas associated with one or more graphical user interface (GUI), and/or other digital images adapted for exposure on a display device, by generating POTI in a TEE. The trusted output engine 206 secures the output of digital images by logically isolating itself from computing application 205 and preventing computing application 205 from accessing protected content, such as security keys. In one embodiment, to logically isolate the trusted output engine 206 from the computing application 205, the trusted output engine 206 is implemented using a separate security and management engine, such as Intel's Manageability Engine (ME), and interfaces with the computing application 205 via a controller interface, such as Intel's host-embedded controller interface (HECI). The trusted output engine 206 may also be isolated from the computing application 205 using other TEE technology, such as secure enclaves (e.g., Intel's SGX technology). As shown in FIG. 2, the trusted output engine 206 comprises a key manager 208, a POTI generator 210, a secure output renderer, and steganography injector 214 to generate, encrypt, and embed POTI within a digital image.

To produce secure graphics outputs, the computing application 205 may call and provide digital image data to the trusted output engine 206. After being called by the computing application 205, the trusted output engine 206 may instruct the key manager 208 to release one or more security keys associated with producing a secure graphics output. The key manager 208 may store one or more security keys in a TEE environment. For example, the security key may be stored in a trusted hardware source that is not exposed to a software stack and/or computing application 205, such as Intel's ME. The security keys may be provisioned and provided to the processing computing system 202 and the display computing system 204 during a display pairing process performed in a secured environment. For example, the security keys can be determined by a user and/or a remote computing system and forwarded to both the processing computing system 202 and the display computing system 204 for storage when pairing the two systems in a TEE. Alternatively, the security keys can have been set previously in a secure factory environment and locked before finishing the construction of the processing computing system 202 and/or the display computing system 204. The security keys may be automatically shared, without input from a user and/or a remote computing system, with the processing computing system 202 and/or the display computing system 204 during the pairing process in a TEE.

A POTI generator 210 may receive the security keys from the key manager 208 to generate POTI, such as secure output markers. In one embodiment, the secure output markers comprise the location display coordinates of a trusted output area, the area size of the trusted output area, and data content that represents the actual data content found within the trusted output area. In one embodiment, the data content found in the secure output markers is a hash value created from the security keys and/or actual data content found within the trusted output area using a hashing algorithm known by persons of ordinary skill in the art, such as Secure Hash Algorithm 2 (SHA-2), message-digest 5 (MD5), and Secure Hash Algorithm 3 (SHA-3). The actual data content of the trusted output digital image data is encoded using data structures known by persons of ordinary skill in the art to encode a digital image, such as a bit array, bitmap, vectors, tuples, and/or lists. The POTI generator 210 may also be configured to encrypt and/or sign the secure output markers using the stored security keys.

The steganography injector 214 may receive the POTI information from the POTI generator 210 and digital image file from the secure output renderer 212 to construct a trusted digital image file. The secure output renderer 212 is configured to create the digital image file based on the digital image data received from the computing application 205. The steganography injector 214 is configured to embed the POTI information in relatively small portions of the digital image file and without affecting the original digital image visually. For example, color for a given pixel may be represented by four bytes. One bit in each of the four bytes may be modified to encode the encrypted secure output marker. In one embodiment, the least significant bit from each color pixel byte may be modified to represent POTI information. Other embodiments may use more than one bit and/or a different bit location (e.g., most significant bit) to store POTI information. Embedding the POTI within digital image file to form the trusted digital image file allows for the trusted output digital image to be forwarded and controlled over insecure channels and are not limited to TEE and/or secured channels. The trusted output digital image data embedded with the POTI may be subsequently be sent to a graphics processing unit (GPU) 216 for rendering in order to display the trusted digital image onto a display device. After the GPU 216 renders the trusted digital image, the rendered trusted digital image is sent to the display computing system 204 for exposure and verification.

The display computing system 204 may comprise a display control logic 230 and a TOI 228 used to indicate to a user whether an outputted digital image originates from an image rendering trusted source. The display control logic 230 is able to support the detection and verification of the POTI when exposing a digital image received from the processing computing system 202. The display control logic 230 may be implemented using one or more display processors and/or display central processor units (CPUs). In one embodiment, the display processor may comprise one or more multi-core processors and/or memory media (e.g., cache memory) that function as buffers and/or storage for data. Additionally, the display processor may be part of one or more other processing components, such as application specific integrated circuits (ASICs), field-programmable gate arrays (FPGAs), and/or digital signal processors (DSPs). As shown in FIG. 2, the display control logic 230 comprises a POTI checker 218, a steganography extractor 220, a POTI verifier 222, and an autonomous indicator control logic 224.

FIG. 2 illustrates that the POTI checker 218 initially receives a rendered digital image and check to see if POTI, such as the secure output markers, appear in pre-determined positions of the rendered digital image. The pre-determined positions may be based on a steganographic encoding process. For example, the secure output markers may be set to adjust the color of every $50^{th}$ pixel. The POTI checker 218 may check every $50^{th}$ pixel to determine whether POTI exists. If the POTI checker 218 fails to find POTI within the pre-determined position, then the TOI within the display computing system 204 is disabled. If POTI is found in the pre-determined positions, the steganography extractor 220 may extract the POTI information, such as the secure output markers, from the rendered digital image. In another embodiment, the position may not be pre-determined positions, and instead position information may be encoded within the POTI. The position information may also be dynamically communicated to the POTI checker 218 over a control channel. If a malicious computing application substitutes different values on the control channel, the POTI that includes the position information may fail to verify.

After extracting POTI, the steganography extractor 220 may then send the POTI to the POTI verifier 222 for decryption, validation, and verification. The POTI verifier 222 may decrypt and validate the POTI using the stored security keys corresponding to the POTI. For example, if secure output markers are used as POTI, the POTI verifier 222 decrypts the secure output markers using the security keys obtained during a display pairing process. Once the POTI verifier 222 decrypts and validates the POTI, the POTI verifier 222 matches the decrypted data content of the POTI with the data content located in the trusted output areas (e.g., the bit array) of the rendered digital image. For example, the POTI verifier 222 performs a lookup using the hash value stored in the secure output markers to determine the actual data content located in the trusted output areas. The POTI verifier 222 may also use the location information stored in the secure output marker to determine the locations of the trusted output area. If the content with the secure output markers matches the actual data content located in the trusted output areas, the POTI verifier 222 may instruct the autonomous indicator control logic 224 to enable the TOI 228.

As persons of ordinary skill in the art are aware, although FIG. 2 illustrates a specific embodiment of a computing system architecture 200, the disclosure is not limited to the specific embodiment illustrated FIG. 2. For instance, embodiments of the present disclosure may combine one or more of the system components into a single system component. Using FIG. 2 as an example, rather than implementing the POTI checker 218, steganography extractor 220, and the POTI verifier 222 in a separate display control logic, the POTI checker 218, steganography extractor 220, and the POTI verifier 222 may be implemented within the GPU 216. A variety of encoding, encryption (e.g., cyclic redundancy checker (CRC)), decryption, and/or embedding hidden information techniques may also be used to generate and verify secure graphics outputs. For instances, a separate set of security keys may be used to encrypt POTI and a different set of security keys may be used to decrypt the POTI. Additionally, the processing computing system 202 may comprises plurality of trusted output engines 206 used to generate secure graphics outputs and one or more display control logic 230 that verify simultaneously and/or in a parallel fashion a plurality of rendered image using a plurality of TOIs associated with the display computing system 204. The use and discussion of FIG. 2 is only an example to facilitate ease of description and explanation.

Figure 3:
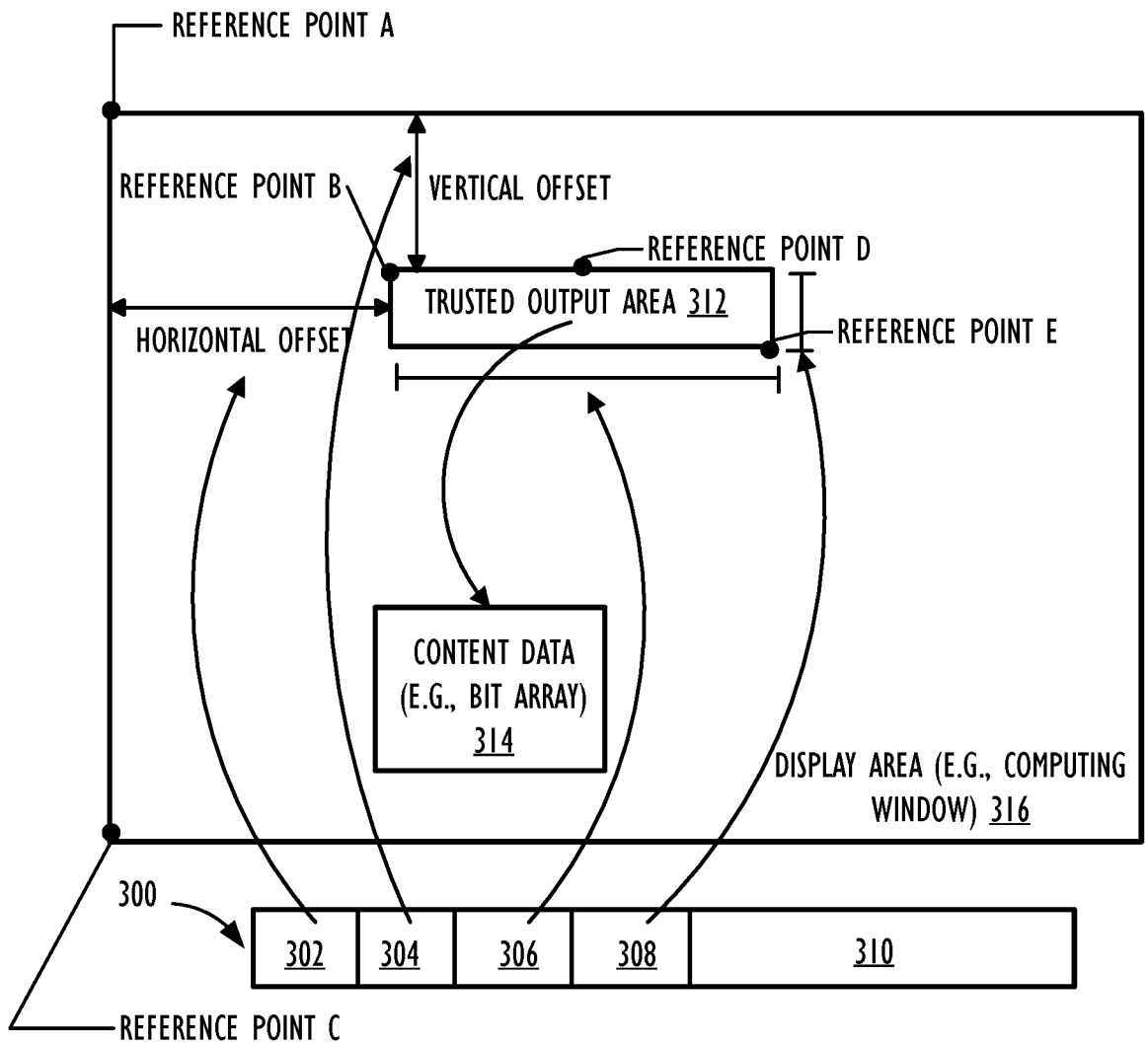
FIG. 3 is illustration of an embodiment of a secure output marker that provides location information of a trusted output area and the content data located within the trusted output area.

FIG. 3 is illustration of an embodiment of a secure output marker 300 that provides location information of a trusted output area 312 and the content data 314 located within the trusted output area. The secure output marker 300 may be encrypted and/or signed using the stored security keys and well-known encryption algorithms, such as an asymmetric encryption algorithm and symmetric encryption algorithm. As shown in FIG. 3, to provide location information of a trusted output area 312, the secure output marker 300 comprises location display coordinates corresponding to a trusted output area 312 and the area size of the trusted output area 312. Using FIG. 3 as a non-limiting example, the secure output marker 300 comprises a horizontal offset element 302, a vertical offset element 304, a width of the trusted output area element 306, and a height of the trusted output area element 308. In one embodiment, each of the data elements 302-308 may be encoded as tuples. Other embodiments of data elements 302-308 may each be encoded using other data structures, such as vectors, lists, and/or arrays.

FIG. 3 illustrates that the horizontal offset element 302 may comprise a value that represents a distance in a horizontal or x direction from a reference point located on the display area 316 to a reference point located on the trusted output area 312. The vertical offset element 304 comprises a value that represents the distance in a vertical or y direction from the reference point located in the display area 316 to the reference point located on the trusted output area 312. In FIG. 3, the values in the horizontal offset element 302 and vertical offset element 304 represents the horizontal distance and vertical distance, respectively, from reference point A to reference point B within the display area 316. The width of the trusted output area element 306 comprises a value that represents the width of the trusted output area 312 from a reference point located on the trusted output area 312, and the height of the trusted output area element 308 comprises a value that represents the height of the trusted output area 312 from the reference point located on the trusted output area 312. In FIG. 3, the width and height of the trusted output area 312 are based on reference point B.

Although FIG. 3 illustrates the use of specific reference points for the display area 316 and on the trusted output area 312, other embodiments may use reference points located in different locations. Values within elements 302-308 may then vary depending on the location of the reference points. Using FIG. 3 as an example, values in the horizontal offset element 302 and vertical offset element 304 would differ if reference point C and reference point E are used rather than reference point A and reference point B. Furthermore, the value of the width of the trusted output area element 306 may differ if reference point D is used instead of reference point B. Specifically, the value of the width of the trusted output area element 306 may represent one half of the total width since the reference point D is located at halfway point of the trusted output area. A variety of different offsets and different reference points may be used to represent the location of the trusted output area 312 within the display area 316.

The secure output marker 300 may also comprises a data element 310 that includes a value used to represent the actual data content located within the trusted output area 312. For example, the actual data content located within the trusted output area 312 may be a bit array of the outputted digital image. In one embodiment, the value in data element 310 may be the bit array corresponding to the trusted output area 312. Alternatively, the data element 310 may be a hash value constructed from stored security keys and/or actual data content located within the trusted output area using a hashing algorithm known by persons of ordinary skill in the art, such as Secure Hash Algorithm 2 (SHA-2), message-digest 5 (MD5), and Secure Hash Algorithm 3 (SHA-3). In other embodiments, the values within the data element 310 may represent values encoded using other types of lookup algorithms, such as binary searches.

Figure 4:
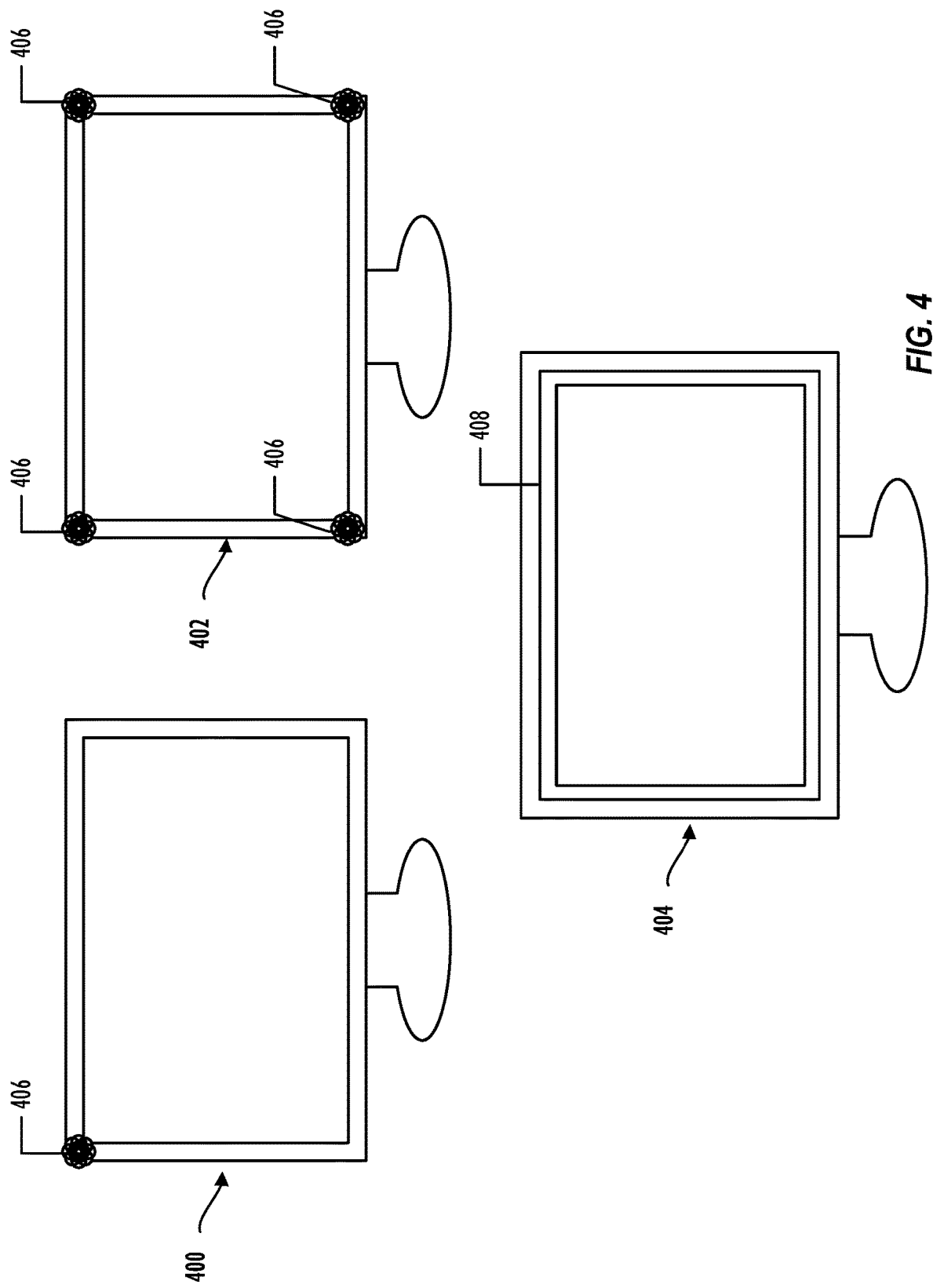
FIG. 4 is illustration of various embodiments of a trusted output indicator (TOI) located on a display device.

FIG. 4 is illustration of various embodiments of a TOI located on a display device. As shown in FIG. 4 the TOI may be implemented using hardware-based indicators. Specifically, FIG. 4 illustrates that display device 400 and 402 may comprise light emitting diodes (LEDs) 406 that acts as TOI to alert users whether the exposed digital image originates from an image rendering trusted source. The LEDs 406 may switch on after the display devices 400 and 402 and/or a connected computing system detect and verify the PUTT for an exposed digital image. The LEDs 406 may switch off if the display devices 400 and 402 and/or a connected computing system fail to detect the POTI or if the POTI is broken for an exposed digital image. In other embodiments, operations of the LEDs 406 may be inversed, where the LEDs 406 are switched off the when the display devices 400 and 402 and/or a connected computing system detect and verify the POTI, and switched on when the POTI is not detected or if the POTI is broken.

FIG. 4 also illustrate that instead of having the TOI be an LED or lamp component, the display device 404 may use other visual-based hardware to implement the TOI. For display device 404, the TOI may be implemented as a highlighted border 408 embedded in the surface of the display device 404. The highlighted border 408 may switch on after the display devices 404 and/or a connected computing system detect and verify the POTI for an exposed digital image, and switch off if the display devices 404 and/or a connected computing system fail to detect the POTI or if the POTI is broken for the exposed digital image. In other embodiments, operations of the highlighted border 408 may be inversed, where the highlighted border 408 are switched off the when the display devices 404 and/or a connected computing system detect and verify the POTI, and switched on when the POTI is not detected or if the POTI is broken.

Other embodiments of a TOI may use other audio, visual, and/or kinetic (e.g., vibration) methods to alert a user. For example, the TOT may be an audio indicator, such as beep that goes off if the exposed digital image does not originate from an image rendering trusted source. Additionally or alternatively, to minimize modification to existing display devices, interfaces, and video format, such as adding hardware-based TOI, the TOI may be exposed onto digital screen of the display device along with the digital image in order to alert the user. For example, a window border may be exposed around the digital image when the display device and/or the connected computing system fail to detect the POTI or if the POTI is broken for the exposed digital image. In another embodiment, the POTI may be displayed on a digital screen, such as a wearable device (e.g., smart glasses) so that the both the TOI (e.g., window borders of the trusted area) and POTI are superimposed onto the original screen.

As persons of ordinary skill in the art are aware, although FIG. 4 illustrates specific embodiment of display device 404 used to implement the TOI, the disclosure is not limited to the specific embodiment illustrated FIG. 4. For instance, embodiments of the present disclosure may include a plurality of TOIs that may indicate whether a plurality of digital images displayed on a display computing system are secure. Each of the TOIs may correspond to one or more of the digital images displayed on a digital screen. The use and discussion of FIG. 4 is only an example to facilitate ease of description and explanation.

Figure 5:
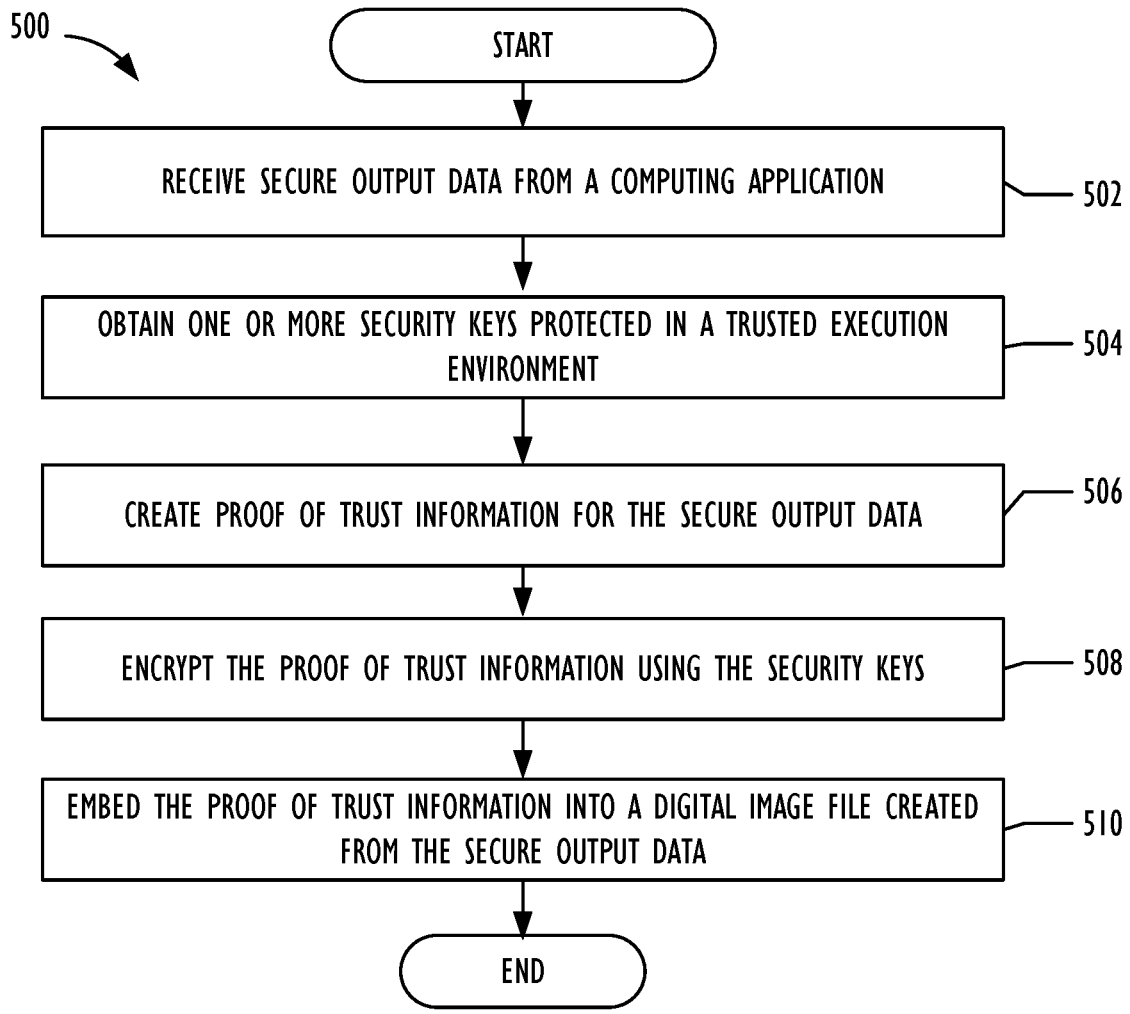
FIG. 5 is a flowchart of an embodiment of method that produce a spoof resistant and a secure graphics output for digital images capable of being exposed by a display device.

FIG. 5 is a flowchart of an embodiment of method 500 that produce a spoof resistant and a secure graphics output for digital images capable of being exposed by a display device. Method 500 may perform the securing of outputted computing graphics using hardware, software (e.g., firmware), or both. Using FIGS. 1 and 2 as an example, method 500 may be implemented using the processing computing system 202 and/or within be one or more mobile devices 110, 112, and 114, computer servers 104, computers 106, and/or other computing systems capable of connecting to computer network 102 and/or cellular network 103. In one embodiment, method 500 may be implemented by the trusted output engine to construct trusted digital images by generating encrypted and/or signed POTI information and embedding the POTI information within a digital image using steganography.

Method 500 may start at block 502 to receive secure output data from a computing application. Method 500 may the move to block 504 to obtain one or more security keys protected in a TEE. By using the TEE, the one or more security keys may be isolated from the computing application and prevents the computing application from accessing the one or more security keys. Method 500 may continue to block 506 and create POTI for the secure output data received by the computing application. In one embodiment, method 500 may create secure output markers that may comprise the location display coordinates of a trusted output area, the area size of the trusted output area, and data content that represents the actual data content found within the trusted output area. Method 500 may then move to block 508 and encrypt the POTI using the security keys. Other embodiments of method 500 may also sign the POTI using the security keys. Afterwards, method 500 may move to block 510 and embed the POTI into a digital image file created from the secure output data.

Figure 6:
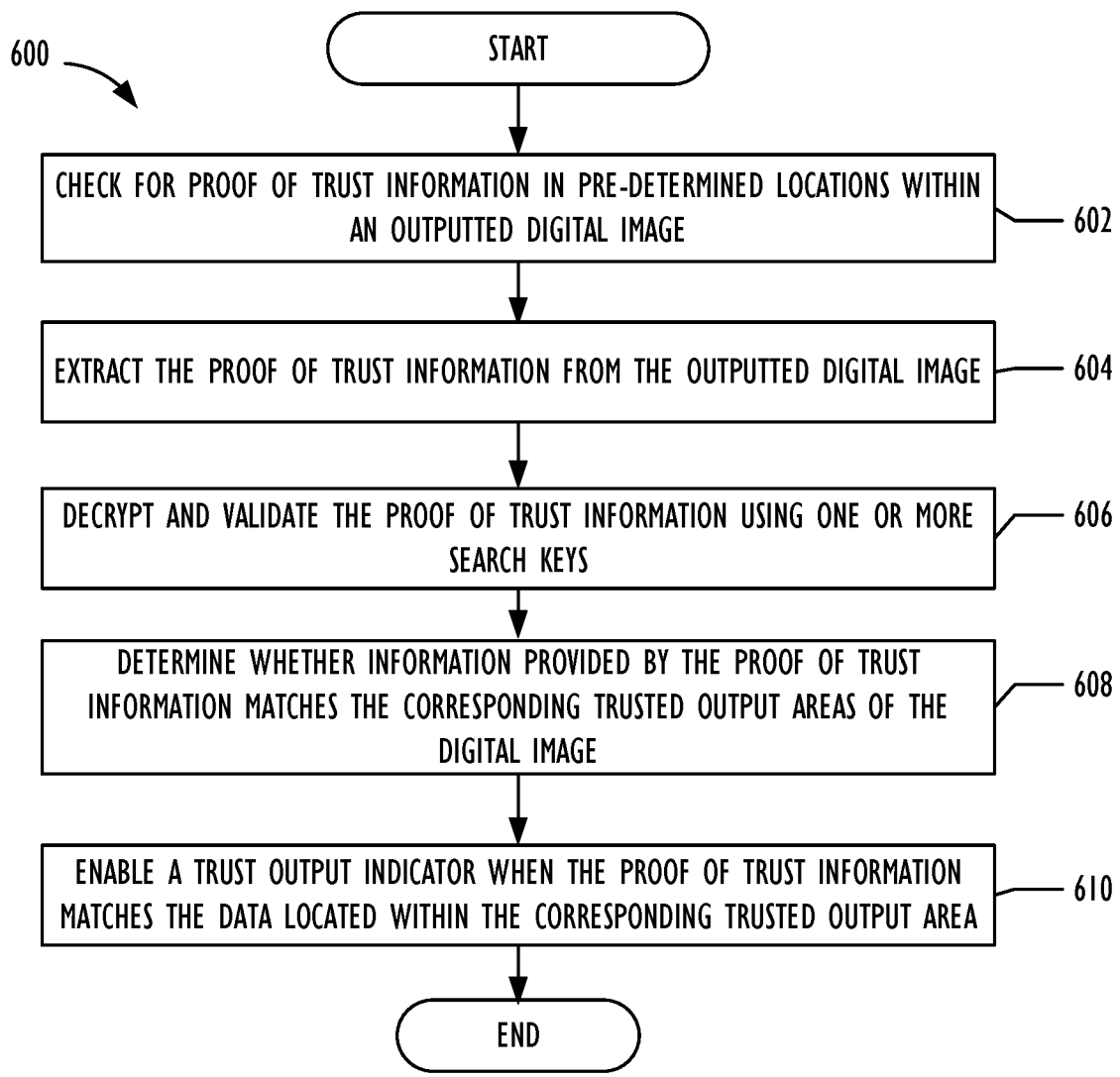
FIG. 6 is a flowchart of an embodiment of method that verifies whether exposed digital images on a display device originates from an image rendering trusted source.

FIG. 6 is a flowchart of an embodiment of method 600 that verifies whether exposed digital images on a display device originates from an image rendering trusted source. Method 600 may perform the verification of exposed digital image using hardware, software (e.g., firmware), or both. Using FIGS. 1 and 2 as an example, method 600 may be implemented using the display computing system 204 and/or within be one or more mobile devices 110, 112, and 114, computer servers 104, computers 106, and/or other computing systems capable of connecting to computer network 102 and/or cellular network 103. In one embodiment, method 600 may be implemented by the display control logic to check, decrypt, validate, and verify whether the exposed digital image originates from an image rendering trusted source.

Method 600 may start at block 602 to check for POTI in pre-determined locations within an outputted digital image. The pre-determined locations may be based on the steganography technique used to embed the POTI within the digital image. Method 600 may the move to block 604 to extract the POTI from the outputted digital image. Method 600 may then continue to block 606 and decrypt and validate the POTI using one or more security keys. The security keys may be obtained during the secured display pairing process. Method 600 may then move to block 608 and determine whether information provided by the POTI matches the data (e.g., bit array) located within the designated trusted output areas of the outputted digital image. In one embodiment, the location information of the designated trusted output area may be obtained directly from the POTI. Afterwards, method 600 may move to block 610 and enable the TOT when the POTI matches the data located within the corresponding trusted output areas.

Figure 7:
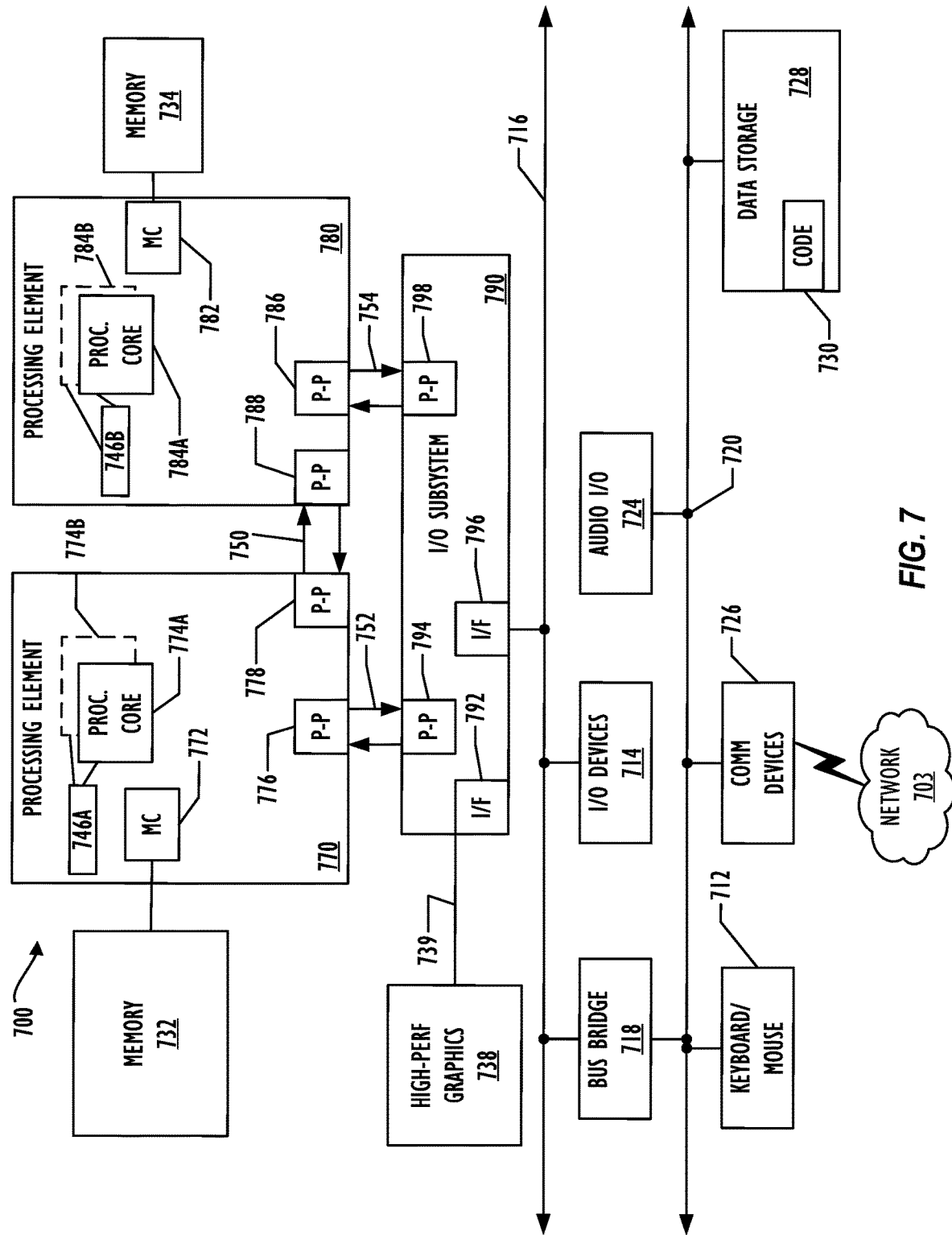
FIG. 7 is a block diagram illustrating an embodiment of a computing device for use with techniques described herein.

Referring now to FIG. 7, a block diagram illustrates a programmable device 700 that may be used for implementing the techniques described herein in accordance with one or more embodiments (e.g., computing system architecture 200, processing computing systems 202, and method 500). The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multidrop bus rather than point-to-point interconnects.

As illustrated in FIG. 7, each of processing elements 770 and 780 may be multicore processors, including first and second processor cores (i.e., processor cores 774a and 774b and processor cores 784a and 784b). Such cores 774a, 774b, 784a, 784b may be configured to execute computing instruction code. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746a, 746b may store data (e.g., computing instructions) that are utilized by one or more components of the processing element, such as the cores 774a, 774b and 784a, 784b, respectively. For example, the shared cache may locally cache data stored in a memory 732, 734 for faster access by components of the processing elements 770, 780. In one or more embodiments, the shared cache 746a, 746b may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770, 780 to respective memories, namely a memory 732 and a memory 734, which may be portions of main memory locally attached to the respective processors. While MC logic 772 and 782 is illustrated as integrated into processing elements 770, 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714, 724 may be coupled to first link 716, along with a bridge 718 that may couple first link 716 to a second link 720. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second link 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. In addition, the elements of FIG. 7 may alternatively be partitioned using more or fewer integrated chips than illustrated in FIG. 7.

Figure 8:
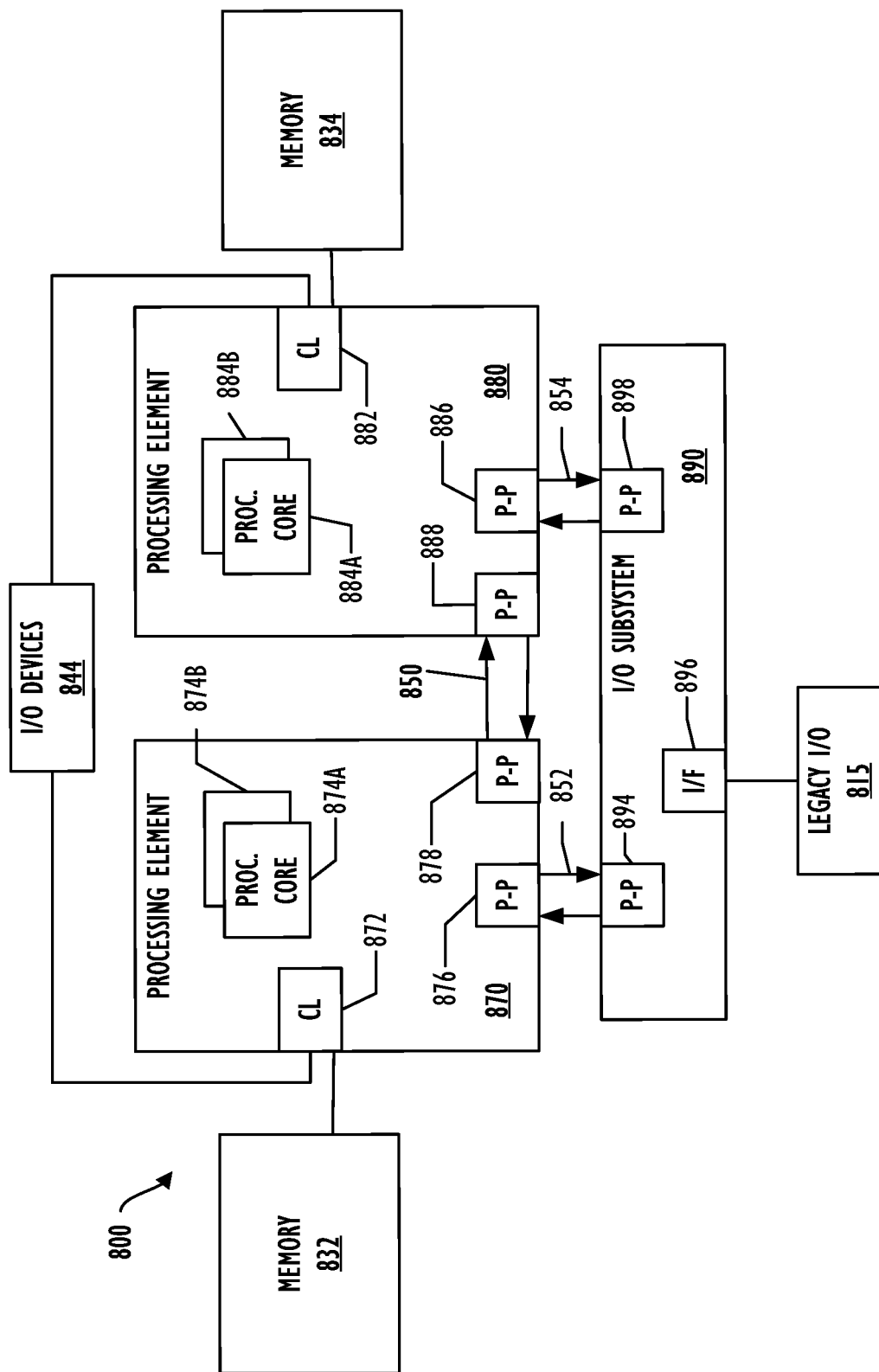
FIG. 8 is a block diagram illustrating another embodiment of computing device for use with techniques described herein.

Referring now to FIG. 8, a block diagram illustrates a programmable device 800 according to another embodiment. Certain aspects of FIG. 8 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the 872, 882 may include memory control logic (MC) such as that described above in connection with FIG. 8. In addition, CL 872, 882 may also include I/O control logic. FIG. 8 illustrates that not only may the memories 832, 834 be coupled to the CL 872, 882, but also that I/O devices 844 may also be coupled to the control logic 872, 882. Legacy I/O devices 815 may be coupled to the I/O subsystem 890 by interface 896. Each processing element 870, 880 may include multiple processor cores, illustrated in FIG. 8 as processor cores 874A, 874B, 884A and 884B. As illustrated in FIG. 8, I/O subsystem 890 includes point-to-point (P-P) interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices that may be utilized to implement various embodiments discussed herein. Various components of the programmable devices depicted in FIGS. 7 and 8 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium on which instructions are stored, comprising instructions that when executed cause a machine to: obtain one or more security keys, create proof of trust information for output data corresponding to a graphics image from a computing application, wherein the proof of trust information comprises location information corresponding to one or more trusted output areas of the graphics image and data information that represent data content found within the trusted output areas, encrypt the proof of trust information using the one or more security keys, embed the proof of trust information within the graphics image to create a trusted graphics image, and render the trusted graphics image for exposure onto a display device.

In Example 2, the subject matter of Example 1 can optionally include that the proof of trust information includes a plurality of secure output markers, where the data information found in the secure output markers are encoded as hash values.

In Example 3, the subject matter of Example 2 can optionally include that the location information includes location display coordinates corresponding to the trusted output areas of the graphics image and area sizes of the trusted output areas.

In Example 4, the subject matter of Example 3 can optionally include that each of the location display coordinates include a horizontal offset value and a vertical offset value.

In Example 5, the subject matter of Example 4 can optionally include that the horizontal offset value and the vertical offset values are determined from a reference point located on the one or more trusted output areas and a second reference point located outside of the one or more trusted output areas.

In Example 6, the subject matter of Example 1 or Example 2 can optionally include instructions, when executed, causes the machine to output the trusted graphics image to a display control logic that enables a trusted output indicator when the proof of trust information is found and verified within the trusted graphics image.

In Example 7, the subject matter of Example 1, Example 2, or Example 6 can optionally include instructions, when executed, causes the machine to embed the proof of trust information within the graphics image comprise instructions that when executed cause the machine to embed the proof of trust information within the graphics image steganographically.

In Example 8, the subject matter of Example 7 can optionally include instructions, when executed, causes the machine to embed the proof of trust information within the graphics image steganographically comprise instructions that when executed cause the machine to embed the proof of trust information within one or more pixels of the graphics image.

In Example 9, the subject matter of Example 1, Example 2, or Example 6 can optionally include instructions, when executed, causes the machine to obtain the one or more security keys comprise instructions that when executed cause the machine to obtain the security keys during display pairing performed in a secured environment.

In Example 10, the subject matter of Example 1 or Example 2 can optionally include that the security keys are stored in a protected environment inaccessible by the computing application.

In Example 11, the subject matter of Example 10 can optionally include that the protected environment is a trusted execution environment.

Example 12 includes a system for securing graphics outputs, comprising: a display device, at least one processor coupled to the display device, and a memory, coupled to the at least one processor, and comprises instructions, when executed by the at least one processor, causes the system to: receive secure output data corresponding to a digital image from a computing application, obtain one or more security keys, create a secure output marker for the secure output data, wherein the secure output marker comprises location information corresponding to a trusted output area of the digital image and data information that represents data content found within the trusted output area of the digital image, encrypt the secure output marker using the one or more security keys, embed the secure output marker within the digital image to create a trusted graphics image and render the trusted graphics image for exposure onto the display device.

In Example 13, the subject matter of Example 12 can optionally include that the data information within the secure output marker is a hash value.

In Example 14, the subject matter of Example 12 or Example 13 can optionally include that the location information includes location display coordinates corresponding to the trusted output area of the digital image and an area size of the trusted output area.

In Example 15, the subject matter of Example 12 or Example 13 can optionally include that the display device comprises a display processor configured to: receive the trusted graphics image, check whether the secure output marker is located in a pre-determined position, decrypt the secure output marker, verify whether the data information that, represents data content found within the trusted output area of the digital image matches an actual data content found within a corresponding trusted output area of the received trusted graphics image, and activate a trusted output indicator, superimpose the secure output markers onto the display device, or both based on the verification of the data information and the actual data content.

In Example 16, the subject matter of Example 12, Example 13, or Example 14 can optionally include instructions that cause the system to embed the secure output marker within the digital image comprise instructions that when executed by the at least one or more processors cause the system to embed the secure output marker within the digital image steganographically.

In Example 17, the subject matter of Example 12 or Example 13 can optionally the security keys are stored in a protected environment inaccessible by the computing application.

Example 18 includes a method for securing graphics outputs, comprising: receiving, using a programmable device, output data corresponding to a graphics image from a computing application, obtaining, using the programmable device, one or more security keys, creating, using the programmable device, proof of trust information for the output data, wherein the proof of trust information comprises location information corresponding to one or more trusted output areas of the graphics image and data information that represent data content found within the trusted output areas, encrypting, using the programmable device, the proof of trust information using the one or more security keys, embedding, using the programmable device, the proof of trust information within the graphics image as hidden information to create a trusted graphics image, and rendering, using the programmable device, the trusted graphics image for display onto a display device.

In Example 19, the subject matter of Example 18 can optionally include that the proof of trust information includes a plurality of secure output markers, where the data information found in the secure output markers are encoded as hash values.

In Example 20, the subject matter of Example 19 can optionally include that the location information includes location display coordinates corresponding to the trusted output areas of the graphics image and area sizes of the trusted output areas.

In Example 21, the subject matter of Example 18 or Example 19 can optionally include receiving, using the programmable device, the trusted graphics image, checking, using the programmable device, whether the proof of trust information is located in one or more pre-determined positions, decrypting, using the programmable device, the proof of trust information, verifying, using the programmable device, whether the data information that represents data content found within the trusted output areas of the graphics image matches actual data content found within corresponding trusted output areas of the received trusted graphics image, and superimposing, using the programmable device, a trusted output indicator, the proof of trust information, or both onto the display device based on the verification of the data information and the actual data content.

In Example 22, the subject matter of Example 18, Example 19, or Example 21 can optionally include that embedding the proof of trust information within the graphics image is implemented by hiding the proof of trust information within the graphics image.

Example 23 includes a system for securing graphics outputs, comprising: a display device comprising a display control logic programmed to: receive a digital image, check whether at least one secure output marker is located in a pre-determined position, decrypt the secure output marker when the secure output marker is found in the digital image, verify whether data information found within the secure output marker matches an actual data content found within a corresponding trusted output area of the received digital image, and activate a trusted output indicator based on the verification of the data information and the actual data content.

In Example 24, the subject matter of Example 23 can optionally include a trusted output hardware engine coupled to the display device and programmed to: receive secure output data corresponding to the digital image, obtain one or more security keys, create the secure output marker for the secure output data, wherein the secure output marker comprises location information corresponding to a trusted output area of the digital image and data information that represents data content found within the trusted output area of the digital image, encrypt the secure output marker using the one or more security keys, and embed the secure output marker within the digital image to create a trusted digital image, and a graphics processing unit configured to render the trusted graphics image for display onto the display device.

In Example 25, the subject matter of Example 23 or Example 24 can optionally include that the trusted output hardware engine is programmed to embed the secure output marker within the digital image by hiding the proof of trust information within the digital image.

Example 26 includes a system for securing graphics outputs, comprising: means to receive output data corresponding to a graphics image from a computing application, means to obtain one or more security keys, means to create proof of trust information for the output data, wherein the proof of trust information comprises location information corresponding to one or more trusted output areas of the graphics image and data information that represent data content found within the trusted output areas, means to encrypt the proof of trust information using the one or more security keys, means to embed the proof of trust information within the graphics image as hidden information to create a trusted graphics image, and means to render the trusted graphics image for display onto a display device.

In Example 27, the subject matter Example 26 can optionally include that the proof of trust information includes a plurality of secure output markers, where the data information found in the secure output markers are encoded as hash values.

In Example 28, the subject matter Example 26 can optionally include that the location information includes location display coordinates corresponding to the trusted output areas of the graphics image and area sizes of the trusted output area.

Example 29 includes a method to perform the steps of the machine readable storage medium of any one of Examples 1-10.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

This patent arises from a continuation of U.S. patent application Ser. No. 15/017,355, filed Feb. 5, 2016, and titled "TRUSTED INDICATORS TO SECURE VISUAL OUTPUTS," which is hereby incorporated herein by reference in its entirety.

What is claimed is:

1. A system to secure graphics outputs, comprising:
    a trusted output hardware engine to:
        access secure output data corresponding to a digital image;
        obtain one or more security keys;
        create a secure output marker for the secure output data, the secure output marker including location information corresponding to a trusted output area of the digital image, and the secure output marker including first data corresponding to actual data in the trusted output area of the digital image;
        encrypt the secure output marker using the one or more security keys; and
        embed the secure output marker in graphical information of the digital image to create a trusted digital image;
    a graphics processing unit to render the trusted digital image for display onto a display device;
    a checker to check whether the secure output marker is located in a pre-determined position in graphical information of the digital image;
    a verifier to verify whether the first data in the secure output marker matches the actual data in the trusted output area of the digital image; and
    autonomous indicator control logic to activate a hardware-based trusted output indicator when the first data matches the actual data, the autonomous indicator control logic not accessible by computing applications executing on a system in communication with the display device.

2. The system of claim 1, wherein the trusted output hardware engine is to embed the secure output marker in the digital image by hiding the secure output marker in the graphical information of the digital image using stenography.

3. The system of claim 1, wherein the trusted output hardware engine is to obtain the one or more security keys during display pairing performed in a trusted execution environment.

4. The system of claim 1, wherein the secure output marker includes location display coordinates of the trusted output area of the digital image, and the secure output marker includes an area size of the trusted output area of the digital image.

5. The system of claim 4, wherein the location display coordinates include a horizontal offset value and a vertical offset value, the horizontal offset value and the vertical offset values determined from a first reference point located on the trusted output area and a second reference point located outside of the trusted output area.

6. The system of claim 1, wherein the hardware-based trusted output indicator is located outside a display area of the display device.

7. The system of claim 1, wherein the one or more security keys are determined by a remote computing system.

8. A storage device or storage disk comprising instructions that, when executed, cause at least one processor to at least:
    access secure output data corresponding to a digital image;
    obtain one or more security keys;
    create a secure output marker for the secure output data, the secure output marker including location information corresponding to a trusted output area of the digital image, and the secure output marker including first data corresponding to actual data in the trusted output area of the digital image;
    encrypt the secure output marker using the one or more security keys;
    embed the secure output marker in graphical information of the digital image to create a trusted digital image;
    render the trusted digital image for display onto a display device;
    determine whether the secure output marker is located in a pre-determined position in the graphical information of the digital image;
    verify whether the first data in the secure output marker matches actual data in the trusted output area of the digital image; and
    activate, using logic, a hardware-based trusted output indicator when the first data matches the actual data, the logic not accessible by computing applications executing on a system in communication with the display device.

9. The storage device or storage disk of claim 8, wherein the instructions are to cause the at least one processor to embed the secure output marker in the digital image by hiding the secure output marker in the graphical information of the digital image using stenography.

10. The storage device or storage disk of claim 8, wherein the instructions are to cause the at least one processor to obtain the one or more security keys during display pairing performed in a trusted execution environment.

11. The storage device or storage disk of claim 8, wherein the secure output marker includes location display coordinates of the trusted output area of the digital image, and the secure output marker includes an area size of the trusted output area of the digital image.

12. The storage device or storage disk of claim 11, wherein the location display coordinates include a horizontal offset value and a vertical offset value, the horizontal offset value and the vertical offset values determined from a first reference point located on the trusted output area and a second reference point located outside of the trusted output area.

13. The storage device or storage disk of claim 8, wherein the hardware-based trusted output indicator is located outside a display area of the display device.

14. The storage device or storage disk of claim 8, wherein the instructions are to cause the at least one processor to receive the one or more security keys from a remote computing system.

15. A method comprising:
   accessing secure output data corresponding to a digital image;
   obtaining one or more security keys;
   creating a secure output marker for the secure output data, the secure output marker including location information corresponding to a trusted output area of the digital image, and the secure output marker including first data corresponding to actual data in the trusted output area of the digital image;
   encrypting the secure output marker using the one or more security keys;
   embedding the secure output marker in graphical information of the digital image to create a trusted digital image;
   rendering the trusted digital image for display onto a display device;
   determining whether the secure output marker is located in a pre-determined position in the graphical information of the digital image;
   verifying whether the first data in the secure output marker matches actual data in the trusted output area of the digital image; and
   activating, using control logic, a hardware-based trusted output indicator when the first data matches the actual data, the control logic not accessible by computing applications executing on a system in communication with the display device.

16. The method of claim 15, further including embedding the secure output marker in the digital image by hiding the secure output marker in the graphical information of the digital image using stenography.

17. The method of claim 15, further including obtaining the one or more security keys during display pairing performed in a trusted execution environment.

18. The method of claim 15, wherein the secure output marker includes location display coordinates of the trusted output area of the digital image, the secure output marker includes an area size of the trusted output area of the digital image.

19. The method of claim 18, wherein the location display coordinates include a horizontal offset value and a vertical offset value, the horizontal offset value and the vertical offset value determined from a first reference point located on the trusted output area and a second reference point located outside of the trusted output area.

20. The method of claim 15, wherein the hardware-based trusted output indicator is located outside a display area of the display device.

21. The method of claim 15, further including receiving the one or more security keys from a remote computing system.

* * * * *